United States Patent [19]

Greiling

[11] Patent Number: 4,854,075
[45] Date of Patent: Aug. 8, 1989

[54] PLANT TRAY

[75] Inventor: Gene E. Greiling, Longwood, Fla.

[73] Assignee: Greiling Farms Inc., Denmark, Wis.

[21] Appl. No.: 128,393

[22] Filed: Dec. 3, 1987

[51] Int. Cl.$^4$ ............................................. A01G 23/02
[52] U.S. Cl. ................................................ 47/73; 47/86
[58] Field of Search ................. 47/73, 77; 47/66, 74, 47/75, 78, 86

[56] References Cited

U.S. PATENT DOCUMENTS

| | | | |
|---|---|---|---|
| 3,164,507 | 1/1965 | Masuda | 47/77 X |
| 3,825,126 | 7/1974 | Pohl et al. | 47/86 X |

OTHER PUBLICATIONS

Florists' Review, Page 79, 8-1978, Advertisement by Growing Systems, Inc.
VEFI Brochure, Penn-Allied Trade Show 7-1981.

Primary Examiner—Robert A. Hafer
Assistant Examiner—M. Shepel
Attorney, Agent, or Firm—Frederick K. Lacher

[57] ABSTRACT

A plant tray (10) having a plurality of cups (14) in a flat sheet (12) of moldable material wherein the cups are in parallel rows (1-7) with at least some of the rows (2,4,6) having spaces (24) between some of the cups (14) for air openings (26) in the flat sheet (12) to supply air to the foliage of plants growing in the cups (14). The cups (14) in adjacent rows may be offset and have a variable width shape such as a hexagon to provide a maximum number of cups in the available space and which are located close to the air openings (26). The cups (14) of hexagonal cross section also have corners (46) for directing the root growth of the plants. The sidewalls (38) of adjacent cups (14) surrounding the air openings (26) form funnels (43) for improved air drainage.

10 Claims, 1 Drawing Sheet

PLANT TRAY

BACKGROUND OF THE INVENTION

This invention relates to plant trays or plug sheets for growing seedlings in plug cups molded in the plant trays. Heretofore plants grown in the plug trays have not been supplied sufficient carbon dioxide and the lower foliage of the plants has become diseased and turned yellow. There has also been a buildup of heat on the surface area between the plug cups which has caused injury to the young plants. Another problem with the round cups used heretofore has been the growth of the roots in a spiraling configuration which has caused some of the plants to suffer from root strangulation.

SUMMARY OF THE INVENTION

In accordance with the present invention, a plant tray is provided in which the plug cups are in parallel rows with at least some of the rows having spaces between the cups for air openings in the tray to supply air to the foliage of the plants growing in the cups. In order to reduce the surface area and increase the number of plug cups in a plant tray of a specific size, the cups in adjacent rows are offset and have a shape with a variable width such as a hexagon. With this construction, a large number of cups may be fitted in the available space and the surrounding cups are located close to the air openings. Cups with a hexagonal cross section also have corners for directing the root growth of the plants in a vertical direction which reduces the spiraling of the roots and root strangulation. The sloping sidewalls of the cups surrounding the air openings form funnels for increasing the supply of air to the air openings and to the plants in the plug cups.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
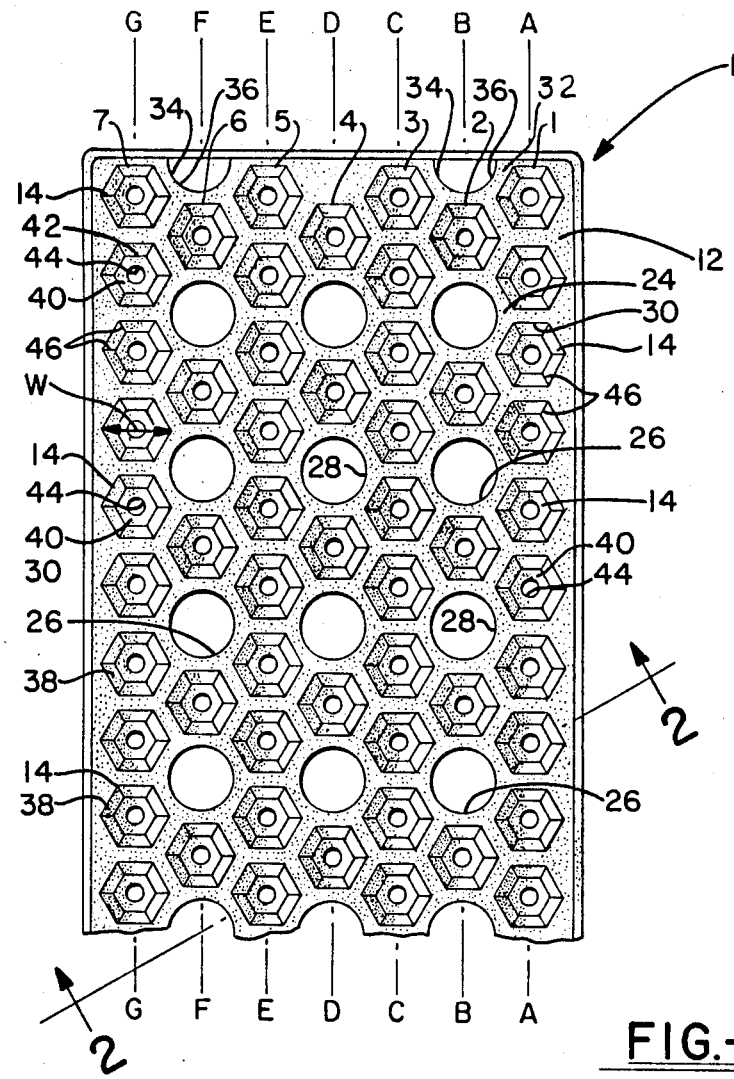
FIG. 1 is a partial plan view of a plant tray embodying the invention supported on a table in a greenhouse.
Figure 2:
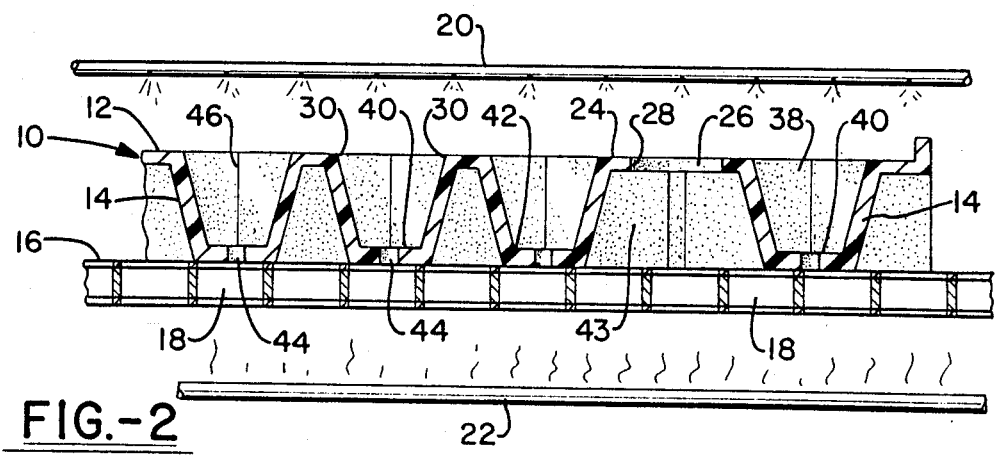
FIG. 2 is a fragmentary sectional view taken along line 2—2 in FIG. 1 showing the plant tray supported on the table under a water spray pipe and over a heating pipe.

Referring to FIGS. 1 and 2, a plant tray 10 is shown having a flat sheet 12 of a suitable, moldable material such as high impact polystyrene with a plurality of cups 14 formed in the flat sheet. The plant tray 10 may be supported on a table 16 having a table top of expanded aluminum or other suitable material providing table top openings 18 for draining water from the plant tray and conveying air and heat to the plant tray. Water pipes 20 may be positioned over the plant tray 10 and heat pipes 22 may be placed under the table 16 supporting the plant tray.

In the embodiment shown, the cups 14 are positioned in rows which, in FIG. 1, have been designated as rows 1 through 7 having generally parallel axes A—A, B—B, C—C, D—D, E—E, F—F and G—G, respectively. In rows 2, 4 and 6, spaces 24 are provided between each of the cups 14 and air openings such as circular holes 26 are stamped or otherwise provided in the spaces for communicating air to the plants in the cups.

As shown in FIGS. 1 and 2, each of the cups 14 has a shape such as a hexagon with a variable width W measured in a direction perpendicular to said axes A—A, B—B, C—C, D—D, E—E, F—F and G—G so that these axes may be closely spaced. This minimizes the distances between edges 28 of the holes 26 and upper edges 30 of the cups 14. With the hexagonal shaped cups 14 the upper edges 30 may also be closely spaced to the upper edges of adjacent cups as shown in FIG. 1. Preferably, the area within the circular holes 26 is substantially the same as the area within the upper edges 30 of the cups 14 to provide the maximum supply of air.

With this construction, each of the edges 28 of the circular holes 26 is adjacent a portion of the upper edges 30 of at least six of the cups 14 to supply air to the plants growing in those cups in the plant tray 10. In rows two and six end spaces 32 are provided at opposite ends of the rows for air openings such as semicircular holes 34. Each of the semicircular holes 34 has an edge 36 adjacent a portion of one of the upper edges 30 of at least three of the cups 14 to communicate air to the plants growing in the cups.

Each of the cups 14 has sidewalls 38 and a base 40 with a smaller area than the cross-sectional area of the cup at the upper edges 30 so that the sidewalls are inclined from lower edges 42 of the sidewalls to the upper edges of the cups. As shown in FIG. 2, the inclined sidewalls 38 form a funnel 43 under each of the circular holes 26 for conveying air from the heat pipes 22 up through the circular holes to the under foliage of the plants in the cups 14. Drainage holes 44 are also provided as by stamping holes in the bases 40 in each of the cups 14.

In operation, seeds are planted in soil placed in the cups 14 of the plant tray 10 which is then placed in a greenhouse with other trays on the table 16. Moisture is supplied by the water pipes 20 spraying over the hexagonal space within the upper edges 30 of the cups 14. Drainage of the cups 14 is through the drainage holes 44 and through the openings 18 in the table top. Heat is provided by the heating pipes 22 with the heated air rising through funnels 43 and the circular holes 26 into contact with the plants growing in the cups 14. The air contains needed carbon dioxide for nourishment of the plants in the microclimate in the foliage. When the heating pipes 22 are not in operation, air may also flow from the space above the plants through the circular holes 26 further providing the air drainage desirable for the foliage microclimate. Water from the water pipe 20 sprayed on the plants passes through the soil in the cups and through the drainage holes 44 providing the desirable root microclimate for growth. The surface area of the flat sheet 12 is minimized with this construction and accordingly the heat buildup on the surface is minimized.

As the plants grow the roots grow down and in a generally spiral direction around the cups 14. The six corners 46 of each of the cups 14 direct the roots downward and reduce the spiraling of the roots which tends to cause the plants to be root strangled.

The plant tray 10 shown in FIGS. 1 and 2 is a standard size tray and has seventy-seven cups 14 which corresponds with a tray of the same size having seventy-two, generally circular cups of approximately the same size but without any means for providing the air drainage. With the construction of this invention, the plant in each cup 14 is supplied air from at least two sides, either from the circular holes 26, the semicircular holes 34 or from the spaces at the edges of the plant tray 10. A plant tray 10 is generally 11 in. (27.94 cm) long by 21½ in. (54.61 cm) wide with circular holes 26 having a diameter of 1¼ in (3.17 cm) and the hexagonal cups 14 having a length in the direction of the axes A—A B—B, C—C, D—D, E—E, F—F and G—G of 1¼ in. (3.17 cm). The cups 14 have a depth of about 1½ in. (3.81 cm) and the base 40 of each cup has a length measured along the axes of the rows of about ⅞ in (2.20 cm).

Another tray (not shown) embodying the invention has the same outside dimensions; however, there are seventeen rows of cups and each of the cups has a length measured along the axes of the rows of ⅝ in (1.57 cm) with the circular holes having a diameter of ½ in (1.27 cm). The depth of the cups is approximately 1 in. (2.54 cm) and the length of the base of each cup is approximately ⅜ in (0.93 cm) with the drainage holes having a diameter of ¼ in. (0.63 cm).

While a certain representative embodiment and details have been shown for the purpose of illustrating the invention, it will be apparent to those skilled in the art that various changes and modifications may be made therein without departing from the spirit or scope of this invention.

I claim:

1. A plant tray comprising a flat sheet of moldable material, a plurality of cups formed in said flat sheet, each of said cups having upper edges in the surface of said flat sheet, cups being disposed in rows, said rows having axes which are substantially parallel and include a first row, a second row and a third row, said second row being positioned between said first row and said third row, said cups in said second row are offset in the direction of the axes of said rows from said cups in said first row and said third air openings in said flat sheet, each of said air openings extending through said flat sheet and having an edge adjacent a portion of said upper edges of said cups adjacent each of said openings to supply air to plants growing in said cups in said plant tray, said spaces being located in said second row and each of said cups of said second row being separated from the next one of said cups of said second row by one of said spaces for providing air openings between each of said cups of said second row.

2. The plant ray of claim 1 wherein each of said cups has a variable width measured in a direction perpendicular to said axes in the plane of said flat sheet whereby said axes of adjacent rows may be closely spaced to minimize the distance between said edge of said air openings and said upper edges of said cups.

3. The plant tray of claim 2 wherein each of said upper edges of said cups has a hexagonal shape whereby said upper edges of each of said cups may be closely spaced to reduce the surface area of said flat sheet.

4. The plant tray of claim 3 wherein each of said air openings has an area substantially the same as the area within said upper edges of each of said cups.

5. The plant tray of claim 4 wherein said air opening has a circular configuration.

6. The plant tray of claim 1 wherein each of said cups has a plurality of flat sidewalls joined at substantially vertical corners for directing the roots of plants in said cups along said corners toward a bottom surface of each of said cups.

7. The plant tray of claim 6 wherein there are six of said flat sidewalls joined at six of said substantially vertical corners and each of said upper edges of said cups is in the shape of a hexagon.

8. The plant tray of claim 1 wherein said second row has end spaces for end air openings extending through said flat sheet at opposite ends of said second row and each of said end air openings has an edge adjacent a portion of said upper edges of at least three of said cups to supply air to plants growing in said cups.

9. The plant tray of claim 1 wherein each of said cups has a hole in the bottom for draining water from said cups.

10. The plant tray of claim 1 wherein each of said cups has sidewalls and a base, said base having a smaller area than the cross-sectional area of said cups at said upper edges, said sidewalls being inclined from the edges of said base to said upper edges forming a funnel under each of said openings for conveying air to said air openings in said flat sheet and thereby supply air to the plants in said cups.

* * * * *